No. 777,220. PATENTED DEC. 13, 1904.
F. PATEE.
CARBURETER FOR EXPLOSIVE ENGINES.
APPLICATION FILED OCT. 24, 1901.
NO MODEL.
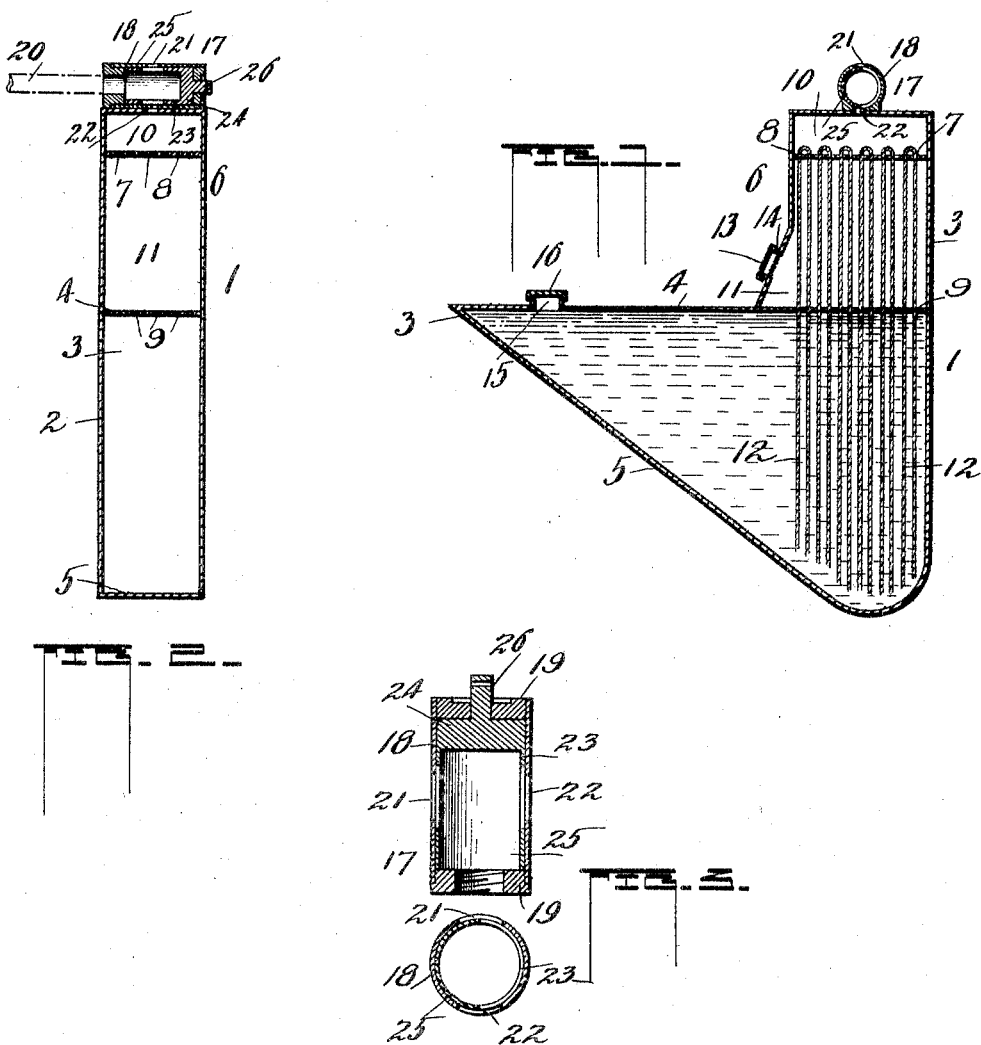
Witnesses:
J. E. Strawn
A. B. LaPorte
Inventor,
Fred Patee.
By Chas. W. LaPorte,
Atty.

No. 777,220. Patented December 13, 1904.

UNITED STATES PATENT OFFICE.

FRED PATEE, OF INDIANAPOLIS, INDIANA.

CARBURETER FOR EXPLOSIVE-ENGINES.

SPECIFICATION forming part of Letters Patent No. 777,220, dated December 13, 1904.

Application filed October 24, 1901. Serial No. 79,755. (No model.)

*To all whom it may concern:*

Be it known that I, FRED PATEE, a citizen of the United States, residing at Indianapolis, in the county of Marion and State of Indiana, have invented certain new and useful Improvements in Carbureters for Explosive-Engines; and I do hereby declare that the following is a full, clear, and exact description of the invention, which will enable others skilled in the art to which it appertains to make and use the same.

My invention relates to improvements in apparatus for carbureting air for the purpose of making inflammable gas; and it consists of certain novel features and details of construction and arrangement of parts hereinafter fully described, and definitely pointed out in the appended claims following the description, due reference being had to the accompanying drawings, forming a part of this specification.

In the drawings, Figure 1 is an elevation in vertical section illustrating my invention. Fig. 2 is an elevation in cross-section. Fig. 3 illustrates in longitudinal and cross section details of the device.

In the present invention it is my object to provide a carbureter which may be simple in construction and perfect in operation and applicable for use in connection with a hydrocarbon-motor used in motor-cycles or other power vehicles where a carbureter may be used.

1 represents a suitable vessel, tank, or reservoir, having the inclosing side and end walls 2 and 3 and the top partition 4. The end walls are integral, as shown, and arranged in such a manner as to form a converging bottom partition 5.

6 refers to an auxiliary or supplemental chambered portion serving as a mixing-chamber for said carbureter, having a bottom partition formed of the top partition 4 of the tank, and the same has a dividing-partition 7, arranged with a series of perforations 8, and in like manner is the partition 4, where it serves as a bottom for the chamber 6, arranged with a series of perforations 9, as shown. This arrangement divides the mixing-chamber into two chambers 10 and 11.

12 represents suitable wicks or other absorbent material laced through the perforations of the walls of the tanks in such a manner as to have their free ends extend down into the main reservoir of the tank substantially in the manner illustrated.

In the front wall of the mixing-chamber 6 is arranged a screw-cap 13, arranged for the admission of air into the mixing-chamber, and 14 is a fine brass or other suitable gauze screen protecting the opening in the wall when the screw-cap 13 is removed. The hydrocarbon may be admitted into the tank proper through an inlet-opening 15, covered by a suitable cap 16, as shown.

17 refers to a valve arranged on the top of the mixing-chamber of the carbureter, as shown. It comprises a barrel 18, having the heads 19 at opposite ends. One of said heads is provided with a threaded opening to enable the coupling therewith of a feed-pipe 20, connecting the carbureter and mixing-chamber with a suitable engine. In the wall of the barrel is provided inlet-openings 21 and 22, the opening 22 communicating with the interior of the chamber 10 of the mixing-chamber for the admission of volatile vapor into the barrel.

23 is the valve proper, having a head portion 24 and the substantially semicircular portion 25. From the head 24 extends a stem 26 through one of the heads 19 of the barrel, to be connected with by a lever, whereby the valve 23 may be actuated for controlling the ingress and egress of vapor. The arrangement of the valve with the semicircular portion 25 enables the operator to actuate the same to open and close or partly open and close the openings 21 and 22 in the barrel simultaneously, admitting a little more air and a little less gas or a little less air and a little more gas through the openings 21 and 22 with one movement of the lever controlling the valve, as may be required to get a perfect explosion in the engine. The arrangement of the valve in conjunction with the carbureter mixing-chamber is such that cold or hot air may be admitted to be mixed with the hydrocarbon-vapor.

Air may be carbureted as follows: The tank is filled with hydrocarbon through the inlet 15 and by capillary attraction saturates the body of the wicks 12, extending down into the body of the tank. Air may be admitted through the inlet 13 to mix with the vapor in the mixing-chamber, and the same is drawn up into the barrel 18 and commingled with hot or cold air, the quantity admitted being regulated by the valve proper, 25, and fed through the feed-pipe 20 to the motor. The placing of the wicks by lacing through the partitions 4 and 7 is so tight as to prevent the liquid hydrocarbon from splashing into the chambers 11 and 10, giving plenty of gas-space in the mixing-chamber, enabling the operator to mix the hydrocarbon-vapor and air perfectly.

The device is constructed in accordance with my plans for a perfect carbureter to be used in conjunction with a hydrocarbon-motor, and I do not wish to limit myself to the exact details as outlined, as various changes may be made in the construction and arrangement as shown and details resorted to without departing from the spirit of the invention herein set out.

Having thus fully described my invention, what I claim, and desire to secure by Letters Patent of the United States, is as follows:

1. In a carbureter, the combination with a hydrocarbon retaining vessel, a partitioned chamber supported by said vessel, wicks laced through the partition and extending through a wall of the vessel, into the body thereof, and an inlet-valve for admission of air into the chamber beneath its partition, substantially for the purpose described.

2. In a carbureter, the combination with a hydrocarbon vessel, a partitioned chamber supported by said vessel, wicks laced through the partition and extending through a wall of the vessel into the body thereof, an inlet-valve for admission of air into the chamber beneath the partition, and a valve supported above the chamber and communicating therewith to control the outlet of vapor therefrom, substantially as specified.

In testimony whereof I affix my signature in presence of two witnesses.

FRED PATEE.

Witnesses:
ALBERT RABB,
J. E. STRAWN.